Patented July 10, 1928.

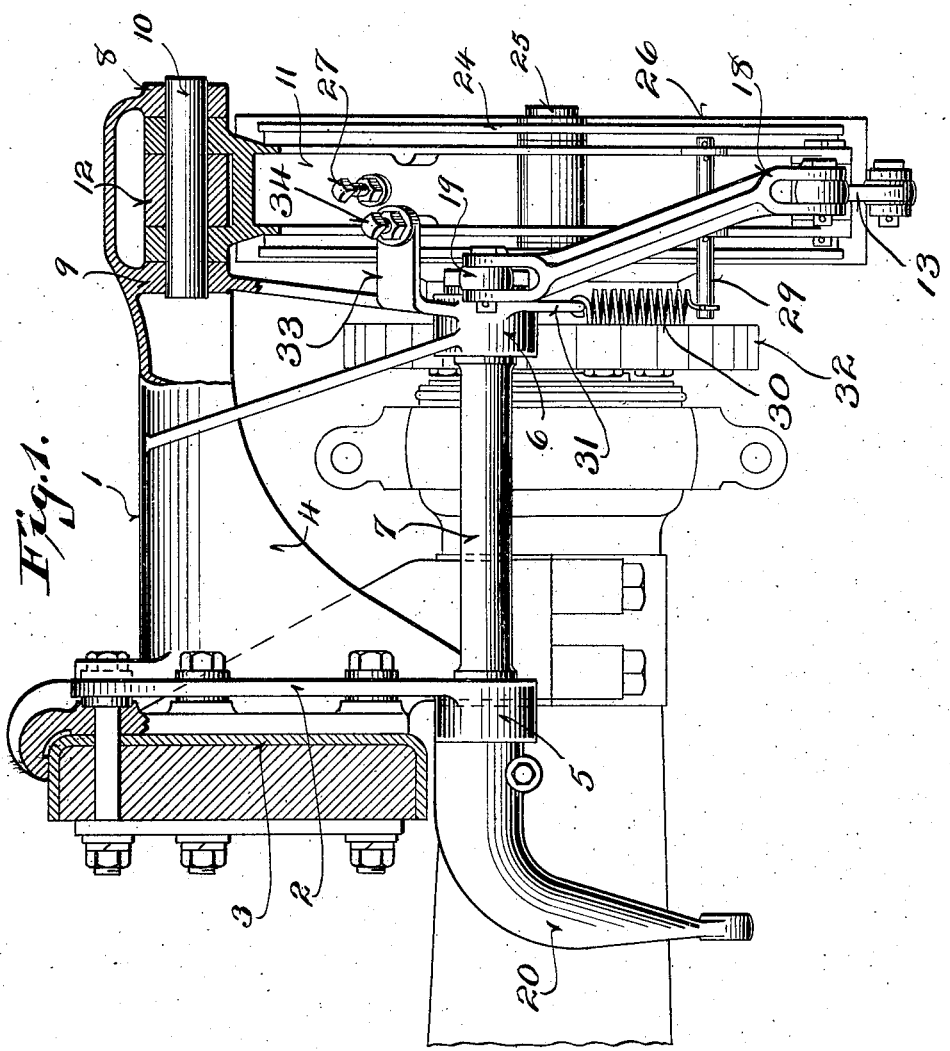

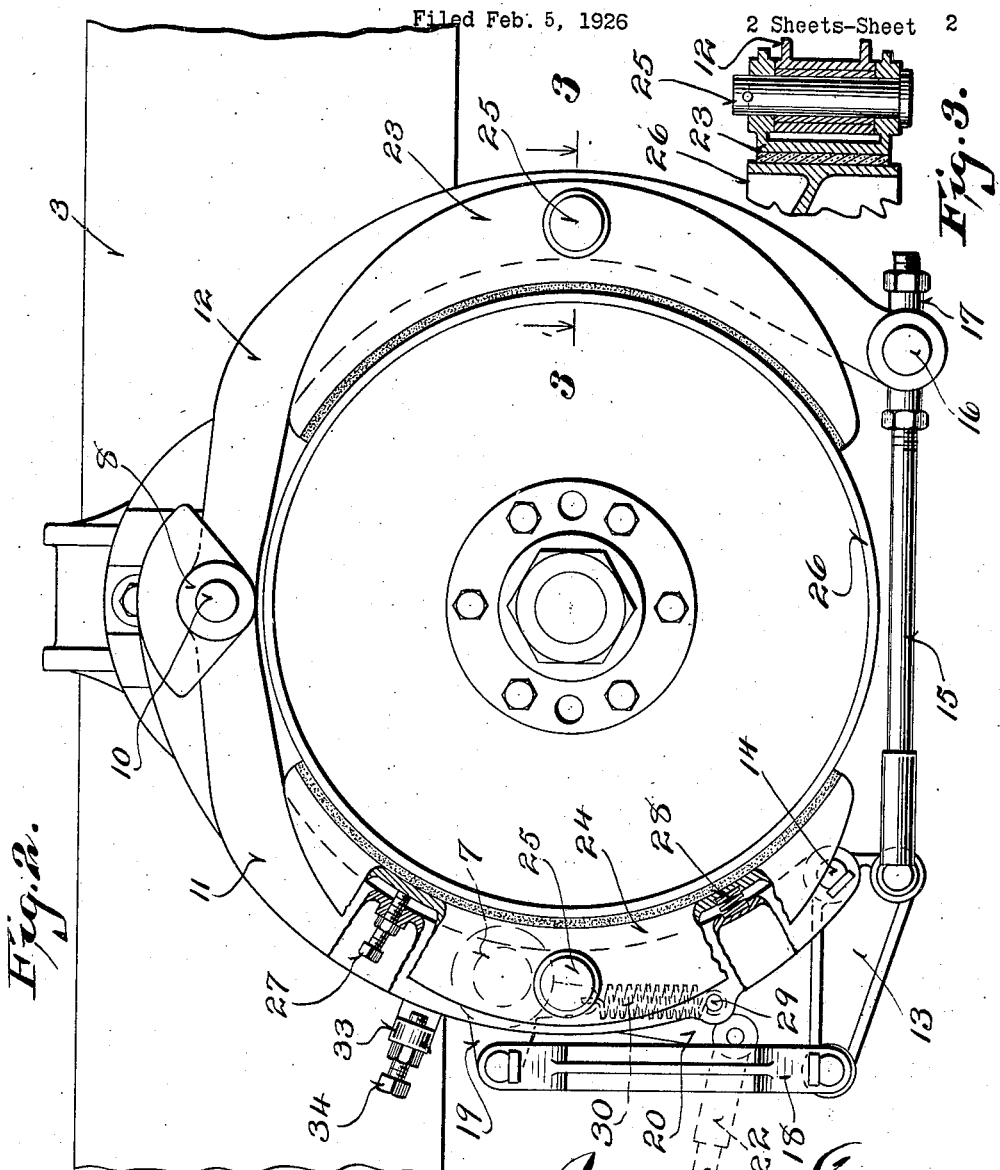

1,676,761

UNITED STATES PATENT OFFICE.

ARTHUR C. WOLLENSAK, ANTON JACOBS, AND PAUL C. BALDUS, OF MILWAUKEE, WISCONSIN, ASSIGNORS TO STERLING MOTOR TRUCK COMPANY, OF MILWAUKEE, WISCONSIN, A CORPORATION OF WISCONSIN.

BRAKE.

Application filed February 5, 1926. Serial No. 86,202.

This invention relates to brakes, and is particularly directed to a jack shaft brake for automotive vehicles.

Objects of this invention are to provide a channel construction throughout the supporting bracket and the brake to secure the maximum strength with the minimum weight of material.

Further objects are to provide a construction of brake which will afford wide bearing surfaces for the brake shoe both for contact with the brake drum, and also for contact with the supporting pins so that the wear is reduced to a minimum.

Further objects are to provide toggle mechanism for operating the brakes with the mechanism positioned in alignment with the brake operating arms and directly beneath the supporting pin for the brake operating levers.

Further objects are to provide a novel means of carrying the brake shoes upon the brake levers to permit the uniform application of pressure throughout the entire area of the brake shoes and also to insure a complete disengagement of the brake shoes from the brake drum throughout the entire extent of the brake shoes, although the brake lever may be pivoted at a single point.

An embodiment of the invention is shown in the accompanying drawings, in which:—

Figure 1 is a view partly in section showing a side elevation of the brake as it appears when attached to the truck.

Figure 2 is a face view of the brakes with parts broken away.

Figure 3 is a sectional view on the line 3—3 of Figure 2.

Referring to the drawings, it will be seen, particularly from reference to Figure 1, that the brake comprises a channel bracket 1 which has attaching arms or flanges 2 bolted to the side frame bars 3 of the truck. This construction is duplicated on opposite sides of the truck and need not, therefore, be repeated in the illustration.

It is to be noted from Figure 1, that the channel bracket 1 has wide webs 4 which are roughly triangular and extend downwardly to the attaching flange 2. Further, this bracket is provided with bearings 5 and 6 for the rock shaft 7 which operates the brake.

The outer end of the bracket is provided with an outer bearing boss or lug 8 and an inner bearing boss or lug 9 which carry the main supporting pin 10 for the brake levers. These brake levers are indicated at 11 and 12 in Figure 2 and from reference to Figure 1, it will be seen that their upper ends are intermeshed at the point where the pin 10 passes therethrough. These upper ends are positioned between the bearings 8 and 9, as illustrated in Figure 1.

The brake levers are approximately arch-shaped and extend downwardly and inwardly. The lever 11 carries at its forked lower end the triangular bell crank lever 13, such lever being pivoted to the brake lever by means of the pin 14. The short arm of the triangular bell crank lever 13 is connected by means of a link or pitman 15 with the forked lower end of the lever 12. It is to be noted that the rod 15 extends through the relatively large pin 16 carried in the forked lower end of the lever 12. The outer end of the rod 15 is threaded and carries the adjusting nuts 17 which engage the pin 16 and thus adjust the effective length of the rod 15. The long arm of the triangular bell crank lever 13 is connected by means of a link 18 with a short arm or lever 19 carried by the rock shaft 7. It is to be noted from Figure 1 that the link 18 slants inwardly towards the truck thus avoiding a long overhang for the shaft 7 and positioning the short lever or arm 19 close to the bearing 6.

The rock shaft 7 may be operated in any suitable manner as by means of the curved lever 20 (see Figure 1), such lever being connected to the brake pedal by means of the link 22 (see Figure 2.)

It is to be noted upon reference to Figures 1 and 2 that the brake levers are channel-shaped throughout and thus the maximum strength with the minimum of weight is attained. This construction is followed in the brake shoes 23 and 24. For example, from reference to Figure 3, it will be seen that the brake shoes are also channel-shaped and enclose the channel-shaped brake levers. They are pivoted centrally of their extent to the brake levers by means of pins 25. These brake shoes conform accurately to the periphery of the jack shaft drum or brake drum 26 and are lined in any suitable manner.

In order to insure the uniform spacing of the brake shoes from the brake drum when the brake is open, a novel construction is provided. A set screw 27 extends through each of the brake levers and projects towards the brake shoes. These set screws are positioned above the pins 25, as shown in Figure 2. Further, a small spring 28 is socketed within suitable recesses in the brake shoes and in the brake levers, as shown on the left hand side of Figure 2. These springs are mounted below the pins 25 and rock the brake shoes into contact with the set screws 27. Thus when the brake levers are opened outwardly the brake shoes tilt and move away from the brake drum so as to be uniformly spaced therefrom at their top and bottom portions although the brake levers are pivoted at their upper ends upon a single pin 10.

When the pressure is applied by means of the mechanism previously described, the brake shoes 23 and 24 independently rock upon the pins 25 and accurately conform to the brake drum 26. Further, by this means, the pressure is uniformly applied to the brake drums throughout the extent of the brake shoes.

One of the brake levers, for instance the brake lever 11, may carry a pin 29 which projects towards the truck and which is attached to one end of a spring 30. The other end of the spring 30 is attached to any stationary portion of the apparatus, such for instance as a lug 31 projecting downwardly from the bearing 6.

It is, of course, to be understood that the jack shaft is rigidly attached to any suitable form of drive such, for instance, as the driving pinion or sprocket wheel 32 which is connected in the usual manner by means of a chain with a corresponding sprocket wheel on the rear axle, or rear wheel of the machine.

It is to be noted further that the arm for supporting the bearing 6 carries an outwardly projecting arm 33 which overhangs the brake lever 11. This arm 33 is provided with a set screw 34 equipped with a suitable lock nut. The set screw 34 projects inwardly towards the brake lever 11 and limits the outward motion of this lever. Thus when the brake is open it is impossible for the entire mechanism to swing back and forth and alternately contact with opposite sides of the brake drum. Instead, the lever 11 opens outwardly until it contacts with the set screw 34. Further opening of the brake causes the other lever to move outwardly and thus insures a correct spacing of both brake shoes from the brake drum.

It will be seen that a novel form of jack shaft brake has been provided which may be most rigidly attached to and supported from the side frame bars of a truck, and it will be seen further that due to the channel construction of bracket, brake levers and brake shoes that the maximum strength and compactness is secured, together with a minimum weight.

It is to be noted further that the peculiar way in which the brake shoes are mounted insures a uniform pressure throughout their extent upon the brake drum irrespective of wear in the shoes and irrespective of the single pivot point for the brake levers. Further, it is to be particularly noted that when the brake is opened that the brake shoes move away from the brake drum throughout their entire extent.

It is to be noted further that novel means have been provided for preventing the swinging of the entire brake mechanism back and forth with consequent contacting with or rubbing against the brake drum. Instead, in the practice of this invention means are provided for insuring the holding of the brake shoes out of contact with the drum.

Although the invention has been described in considerable detail, it is to be understood that the invention may be variously embodied and is, therefore, to be limited only as claimed.

We claim:

A jack shaft brake for automotive vehicles provided with a jack shaft brake drum, said brake comprising a channel-shaped bracket attached to the side frame bar of the automotive vehicle and projecting outwardly above said brake drum and having a pair of spaced bearings, a pin carried between said bearings, a pair of channel-shaped brake levers having intermeshing upper ends pivotally mounted upon said pin, a pair of channel-shaped brake shoes enclosing a portion of said brake levers and pivoted intermediate the ends of said shoes to said brake levers, said brake shoes being adapted to grip the brake drum between them, set screws carried by each of said brake levers and limiting the swinging motion of the brake shoes in one direction, springs interposed between said brake shoes and brake levers and tending to swing such brake shoes into contact with the set screws, a bell crank lever pivoted to one of said brake levers and connected to the other of said brake levers by means of a link, means for rocking said bell crank lever, and an adjustable stop carried from said bracket for limiting the outward motion of one of said brake levers.

In testimony that we claim the foregoing we have hereunto set our hands at Milwaukee, in the county of Milwaukee and State of Wisconsin.

ARTHUR C. WOLLENSAK.
ANTON JACOBS.
PAUL C. BALDUS.